(12) United States Patent  (10) Patent No.: US 7,469,648 B2
Bettin  (45) Date of Patent: Dec. 30, 2008

(54) FRONT FOLD PLANTER LIFT AND FOLD HYDRAULIC CONTROL SYSTEM

(75) Inventor: Leonard A. Bettin, Lagrange Park, IL (US)

(73) Assignee: CNH America, LLC, Racine, WI (US)

( * ) Notice: Subject to any disclaimer, the term of this patent is extended or adjusted under 35 U.S.C. 154(b) by 258 days.

(21) Appl. No.: 11/468,995

(22) Filed: Aug. 31, 2006

(65) Prior Publication Data

US 2008/0053351 A1  Mar. 6, 2008

(51) Int. Cl.
 A01B 49/00 (2006.01)
 A01B 79/00 (2006.01)
 A01C 5/00 (2006.01)
 A01C 7/18 (2006.01)
 A01C 15/00 (2006.01)

(52) U.S. Cl. .......................... 111/52; 111/53; 111/200; 111/900; 172/1; 172/311; 172/776

(58) Field of Classification Search ............. 111/52–78, 111/134–138, 200, 900; 172/1–12, 311, 172/317–328, 400–423, 452–506, 663–668, 172/776
See application file for complete search history.

(56) References Cited

U.S. PATENT DOCUMENTS

| 3,246,569 A | 4/1966 | Littwin |
| 3,347,043 A | 10/1967 | Freese |
| 4,413,685 A | 11/1983 | Gremelspacher et al. |
| 6,009,354 A | 12/1999 | Flamme et al. |
| 6,061,617 A | 5/2000 | Berger et al. |
| 6,292,729 B2 | 9/2001 | Falck et al. |
| 6,371,214 B1 | 4/2002 | Anwar et al. |
| 6,561,076 B2 | 5/2003 | Hou et al. |
| 6,808,054 B2 | 10/2004 | Hirt et al. |
| 2005/0121878 A1 | 6/2005 | Muldoon |

FOREIGN PATENT DOCUMENTS

DE  3246569 A1  6/1984

*Primary Examiner*—Christopher J. Novosad
(74) *Attorney, Agent, or Firm*—Rebecca Henkel

(57) ABSTRACT

A hydraulic control system for use with a front fold planter is configured to move the tool bar of the planter between a first height corresponding to a planting position, a second height corresponding to a field transport position and a third height corresponding to a road transport position. A first set of hydraulic cylinders is mounted to the tool bar for moving the frame between the first height, the second and the third height. A second set of hydraulic cylinders is mounted to the tool bar for moving the frame between the first height and the second height. The first and second set of cylinders are arranged in a master/slave relationship relative to each other and operable independent of each other.

20 Claims, 10 Drawing Sheets

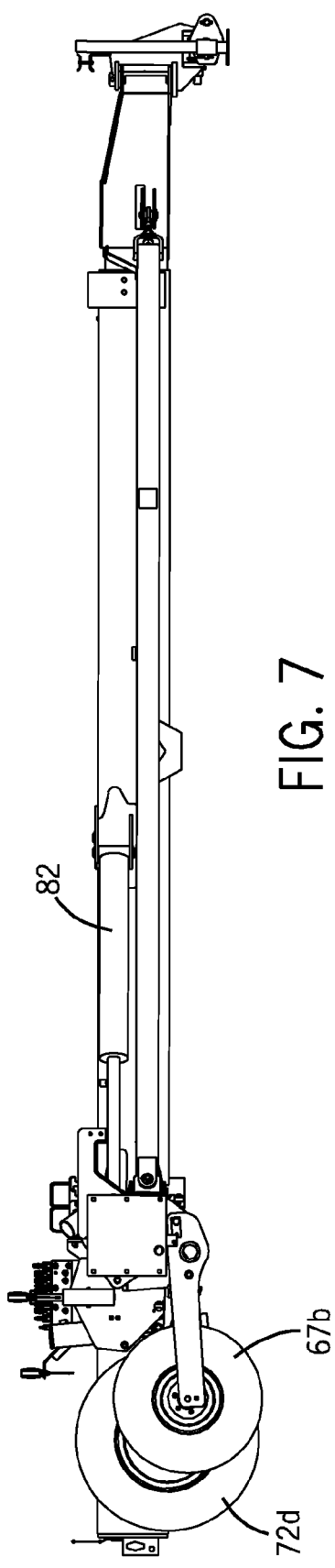
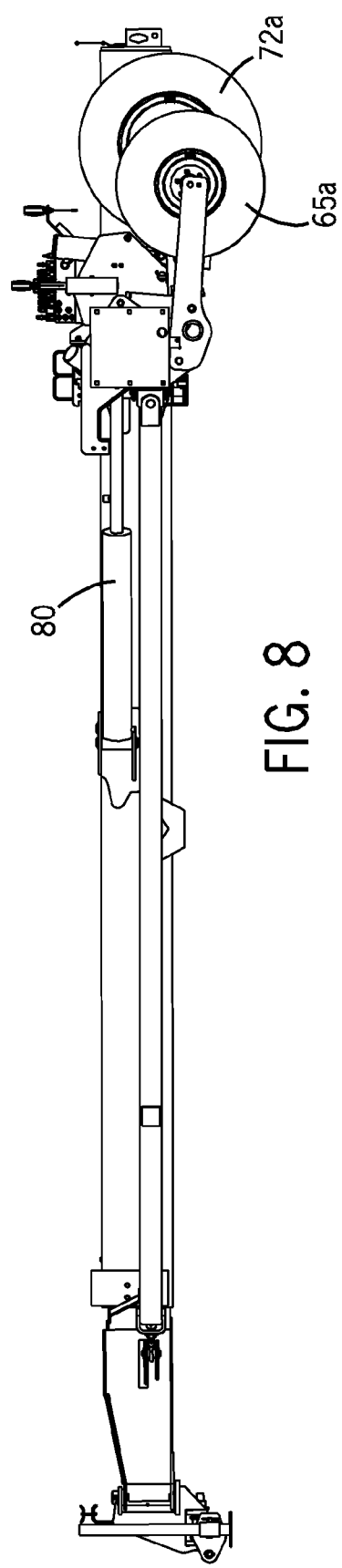

| | |
|---|---|
| OPERATION | FOLD ▽ |
| FOLD MARKERS | BACK |
| LIMITED RAISE | BACK |
| FOLD WINGS | BACK |
| RAISE HITCH | NEUTRAL |
| RAISE CENTER | BACK |
| RAISE WHEELS | FORWARD |

FIG. 13

FRONT FOLD PLANTER LIFT AND FOLD HYDRAULIC CONTROL SYSTEM

RELATED APPLICATIONS

Not applicable.

BACKGROUND OF THE INVENTION

1. Field of the Invention

The invention relates generally to work vehicles such as agricultural planters. More particularly, it relates to a hydraulic control system for an agricultural planter that includes a series of master cylinders having slave cylinders operably connected therewith. Even more particularly, it relates to a hydraulic control system wherein the master and slave cylinders can be operated independently of one another such that the master cylinder can be operated to effect distinct field transport and road transport heights.

2. Discussion of the Related Art

Conventional planters typically include a series of evenly spaced row planter units connected to an implement frame or tool bar so as to be towed across a field. The row planter units are generally configured to plant particulate product (i.e., seed, herbicide, pesticide, fertilizer, etc.) in evenly spaced individual rows. The planter is usually towed by a propelling vehicle such as a tractor or other prime mover across the field. As the planter, reaches the end of a row, or requires transport from a field to another more remote location, it is often necessary to reconfigure the planter from a field planting configuration or position to a field transport (for movement between planting rows), or folded road transport position.

In many prior art systems, hydraulic lift systems are utilized to reconfigure the planter to and from the above noted positions. In such prior art systems, remote hydraulic valves provide hydraulic flows to locations on the tool bar to adjust the positioning of the same. The valves are controlled in an operator station in the cab of the vehicle, most commonly by manipulating a control device that provides a signal and indicates a desired flow rate to or from the hydraulic valve. The hydraulic valves are typically connected to a manifold or manifolds, most commonly located at the rear of the vehicle, to which hydraulic actuators are mounted. The hydraulic actuators include such things as hydraulic motors and cylinders. By manipulating the control device, the operator can vary the flow direction and the flow rate to the manifold, and hence to the hydraulic actuators located on the tool bar.

However, known hydraulic systems have drawbacks. Most notably, in most prior art systems, the maximum road transport height (height used herein means the clearance of the tool bar from the ground) and the field transport height is often the same. This is due to the fact that when an operator strokes a master cylinder controlling the height of the central wheels to the exclusion of the slave cylinder controlling the wing wheels, both cylinders typically bottom out thereby limiting the maximum raised height of the planter tool bar from the ground. The limited maximum height of the road transport position has proved problematic when the planter needs to be moved long distances over ditches and other uneven surfaces. Portions of the planter may not have adequate clearance to cross these uneven surfaces. Likewise, the height (clearance of the tool bar from the ground) of the field transport position in many of these systems is unnecessarily high. As the field transport position most commonly only requires turning between adjacent rows, it is unnecessary to raise the system to the same height required for road transport.

There have been some attempts at providing a planter that can fold into distinct field transport and road transport configurations. For example, one known system includes a front fold planter configured such that when the wing wheels are retracted, oil from the slave cylinders in communication with the wing wheels is moved through a solenoid valve and routed into a master cylinder thereby stroking the master cylinders to achieve a higher road transport height. This system, while somewhat satisfactory for its intended purpose, exhibits drawbacks as the routing system is overly complex and costly to manufacture.

Therefore, there is a need or desire for a hydraulic control system for a work vehicle such as a front fold planter to address the drawbacks described above. The hydraulic control system should also be configured to be utilized with a wide variety of bar supported implements frames and/or vehicles in addition to those related to agriculture. The hydraulic control system should also be versatile so as extend its lifetime and minimize replacement. Also, the hydraulic system should be simple in design so as to reduce costs associated with labor and manufacturing.

SUMMARY OF THE INVENTION

The present invention provides a hydraulic control system, an agricultural frame and a method of lifting and folding a front fold planter that addresses the drawbacks described above. The hydraulic control system of the invention allows for a master and slave cylinder arrangement wherein the master and slave can be operated independently of one another to effect distinct field transport and road transport heights. The hydraulic control system of the invention is also simple in design and parts for ready manufacturability.

In a first embodiment of the present invention, a hydraulic control system for use with an agricultural implement frame is configured to move between a first height, a second height and a third height from a supporting surface. The system includes a first set of hydraulic cylinders mounted to the implement frame and configured to move the frame between the first height, the second height and the third height. A second set of hydraulic cylinders are mounted to the implement frame configured to move the frame between the first height and the second height. The first and second set of cylinders are arranged in a master/slave relationship relative to each other and are operable independent of each other.

In the preferred embodiment of the system, the actuation of the first and second set of hydraulic cylinders moves the frame between the first height and the second height. The actuation of the first set of hydraulic cylinders moves the frame between the second height and the third height. At the first height the implement frame is orientated in a ground engaging position. At the second height the implement frame is orientated at a height greater than the first height and at the third height the implement frame is orientated at a height greater than the first and second heights. A third set of cylinders is configured to fold the implement frame.

In one embodiment, the agricultural implement frame may be a tool bar of a front fold planter that includes first and second wing sections. The first set of hydraulic cylinders may be connected to a main wheel set and the second set of cylinders may be connected to first and second wing wheel assemblies.

In another embodiment, the present invention provides an agricultural frame that includes a tool bar configured to move between a first height, a second height and a third height above a supporting surface and a hydraulic control system for controlling movement of the tool bar. The hydraulic control system includes a first set of hydraulic cylinders mounted to the tool bar configured to move the frame between the first height, the second and the third height. A second set of hydraulic cylinders are also mounted to the implement frame and configured to move the frame between the first height and the second height. The first and second set of cylinders are arranged in a master/slave relationship relative to each other and operable independent of each other.

In the preferred embodiment of the frame, the first and second set of hydraulic cylinders are extended or retracted to move the tool bar from the first height to the second height. The first set of hydraulic cylinders is also independently extended or retracted to move the tool bar between the second height to the third height.

Preferably, at the first height the tool bar is orientated in a planting position, at the second height the tool bar is orientated in a field transport position above the planting position and at the third height the tool bar is orientated in a road transport position above the planting position. In one embodiment, the frame includes a third set of cylinders configured to fold the tool bar into the road transport position.

In still another embodiment, the tool bar includes first and second wing sections connected to first and second wing wheel assemblies and a main wheel set connected to the tool bar. The first set of hydraulic cylinders is connected to the main wheel set and the second set of cylinders is connected to first and second wing wheel assemblies. In a road transport position, the second set of cylinders retracts independently to retract the first and second wing wheel assemblies.

In a final embodiment, a method of moving an implement frame includes actuating a first and a second set of hydraulic cylinders mounted to the implement frame to move the frame between a first height and a second height, and actuating the first set of hydraulic cylinders to move the frame between the second height and a third height. Preferably, the first and second set of cylinders are arranged in a master/slave relationship relative to each other and are operable independent of each other. The method may also include the step of folding the frame by actuating a third set of hydraulic cylinders mounted to the implement frame.

Other aspects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 7 illustrates a first side elevation view of the front fold row planter unit shown in FIG. 5.

FIG. 8 illustrates an alternative side elevation view of the front fold row planter unit shown in FIG. 5.

FIG. 11-13 illustrate schematic representations of a touch type electronic monitor for controlling the hydraulic control system of the present invention.

DETAILED DESCRIPTION OF THE PREFERRED EMBODIMENTS

Figure 9:
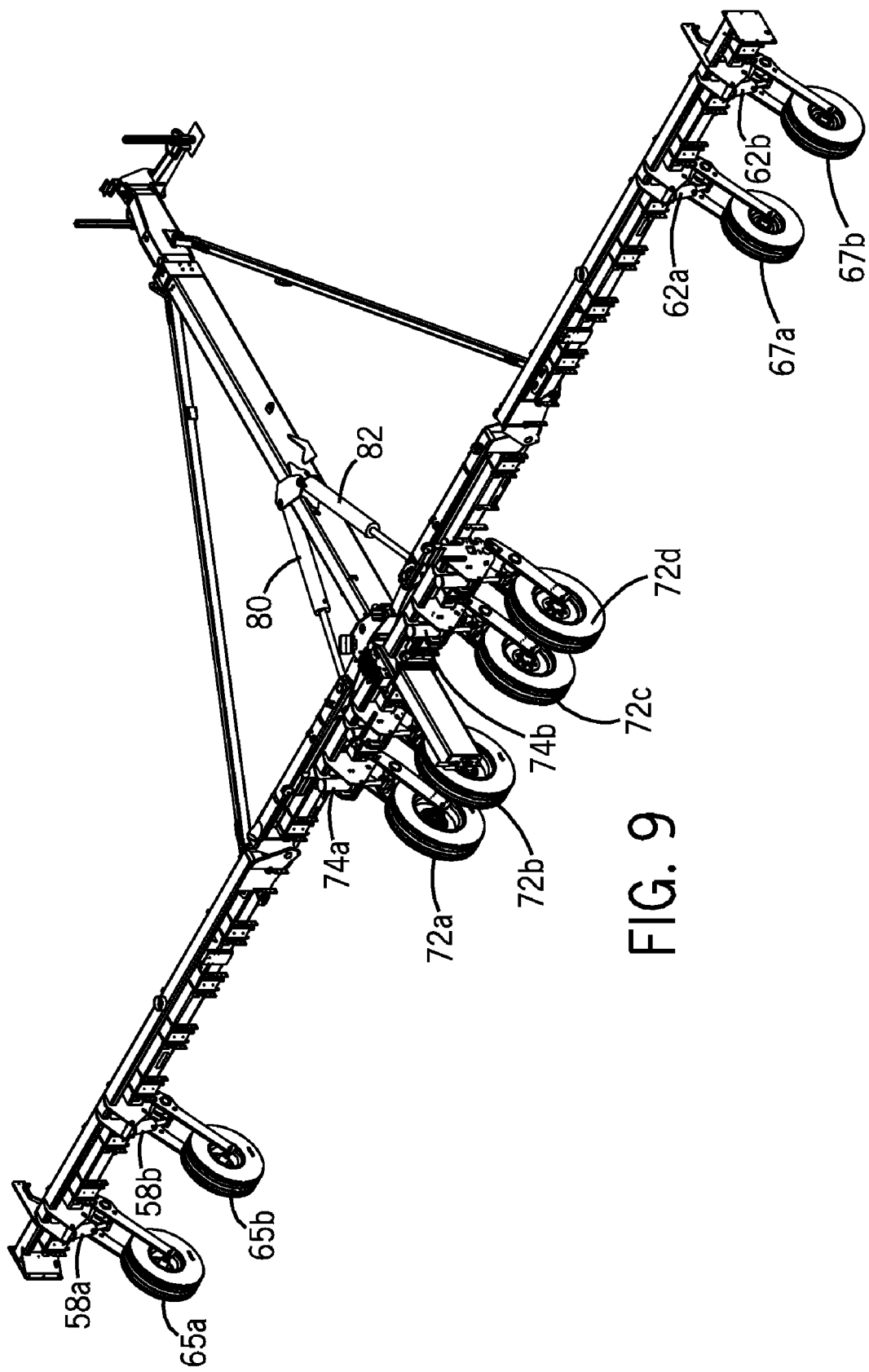
FIG. 9 illustrates an isometric view of the front fold row planter unit in a field transport orientation employing a hydraulic system in accordance with the present invention.
Figure 10:
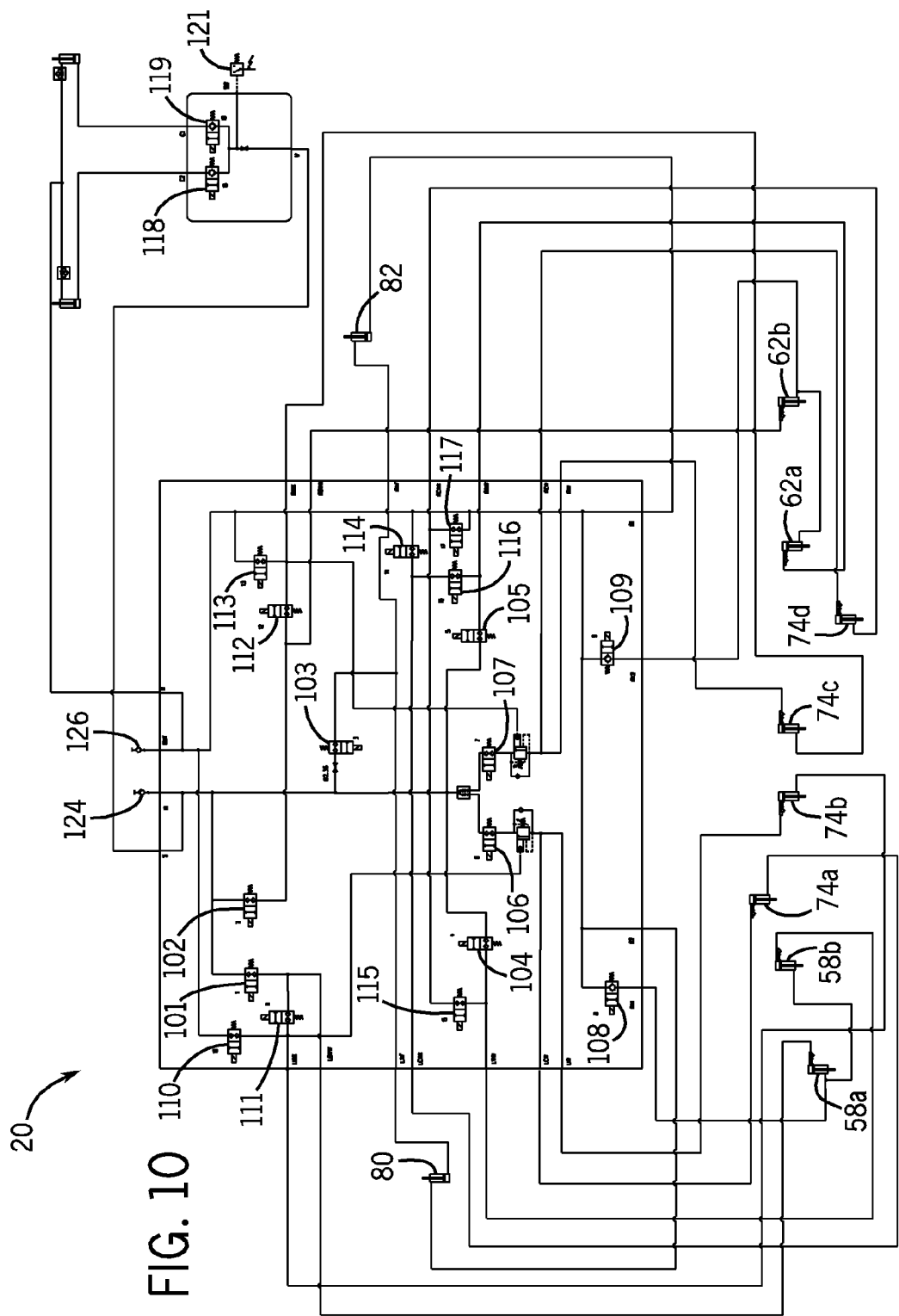
FIG. 10 illustrates a fluid circuit diagram of the hydraulic control system in accordance with the present invention.

FIG. 10 illustrates a hydraulic control system 20 in accordance with the present invention in combination with a front fold planter 22, the system 20 generally configured to arrange an implement frame such as tool bar 24 of the front fold planter 22 (illustrated in FIGS. 1-9) in alternative road transport 26 (FIGS. 1-4), planting 28 (FIG. 5-8) and field transport 30 (FIG. 9) positions. The hydraulic control system 20 enables the tool bar 24 to achieve distinct field transport and road transport heights. The term "height" used herein refers to clearance of the tool bar 24 from the ground.

Referring to FIGS. 1-9, the exemplary front fold planter 22 is a conventional agricultural planter equipped to be drawn by a prime mover (not shown) across an agricultural field in a conventional manner. As best seen in the first position or planting position 28, illustrated in FIG. 5, the exemplary planter 22 planter includes a longitudinal central main frame 32. A support and connecting structure for attachment to a tractor or other prime mover, generally designated 34, is connected to the forward end of the central main frame 32. The support 34 may include known components such as a parallel linkage and hydraulic cylinder unit for connecting (and raising) the forward end of the central main frame 32 for connection to a tractor hitch, (not shown).

Although not shown, the central main frame 32, may include a long hydraulic cylinder unit with its barrel end connected to a rear end of an outer telescoping member, and its rod connected to a forward end of the inner telescoping member thereby enabling the hydraulic cylinder unit to extend and retract the main frame as is known in the art.

Left and right wing sections (or first and second wing sections) generally designated 36 and 38 respectively are pivotally mounted to the rear of the central main frame 32 for rotation in horizontal planes about pins 40, 41 respectively. As is conventional, the terms "left" and "right" refer to sides of the planter when looking in the direction of travel of the implement.

The rear end of the central main frame 32, as well as the innermost portions of the left 36 and right 38 wing sections are supported by a main wheel set generally designated 42 which is mounted on a carriage 39 for controlled, sliding motion along the rear portion of the central main frame 32. As discussed below, each wheel of the main wheel set 42 includes an associated hydraulic lift cylinder unit 74a-d and linkage. Braces or links 50a and 50b are pivotally connected at 44a and 44b respectively to the forward end of the central main frame 32, and pivotally connected at 48a and 48b respectively to an intermediate location of a main tubular frame member 52 of the left wing section 36 and at an intermediate location of the main tubular frame member 54 of the right wing section 38. The links 50a, 50b are commonly referred to as "fold links", although they also perform the function of bracing the wing sections in the open or planting position, as persons skilled in the art will understand.

The tubular frame members 52 and 54 of the left 36 and right 38 wing sections, respectively, form part of the implement frame or tool bar generally referred to as 24. As is known in the art, the ground working tools, such as individual planter units (not shown), are mounted to the tool bar 24. The invention, as persons skilled in the art will appreciate, is not limited to any particular row units, nor even to row units in general. For example, grain drills, could be mounted to the tool bar 24. Moreover, persons skilled in the art will appreciate that the implement frame or tool bar 24 of the illustrated embodiment may serve as a carrier frame for other tools such as cultivator sweeps, chisel plows, sprayers, or anhydrous ammonia applicators, if desired. These applications, as well as the manner in which individual row units are constructed and mounted to the toolbar 24, are conventional and form no part of the present invention.

In the illustrated embodiment, left and right wing sections 36 and 38, respectively, may include, for example, twelve individual planter row units. The left wing section 36 is supported at one end by the main wheel set 42 and at its outboard end by two left wing support wheel assemblies 56, each including an associated hydraulic lift cylinder unit 58a and 58b and linkage. Similarly, the outboard end of the right wing section 38 of the illustrated embodiment is supported by two right wing support wheel assemblies 60, lift cylinder units 62a, and 62b and linkages. As discussed below, in operation, the ground support wheels 65a, 65b of the left wing 36 extend behind the tool bar 24, and serves as a base in which to raise the planter left wing by extending the hydraulic cylinder units 58a, 58b. Alternatively, if the hydraulic cylinder units 58a, 58b are retracted, the outboard end of the left wing 36 is lowered. Similarly, the ground support wheel 67a, 67b of the right wing 38 extend behind the tool bar 24, and serve as a base in which to raise the planter right wing 38 by extending the hydraulic cylinder units 62a, 62b. If the hydraulic cylinder units 62a, 62b are retracted, the outboard end of right left wing 38 is lowered.

The main wheel set 42 includes four ground support wheels 72a-d as is known in the art. Each ground support wheel includes an associated hydraulic lift cylinder unit 74a-d, and linkage. In operation, the ground support wheels 72a-d are connected to a base or carriage 39 moveably connected to the tool bar 24. The carriage 39 raises both the planter left wing 36 and right wing 38 in the folded road transport position 26 by extending the hydraulic cylinder units 72a-d. When the hydraulic cylinder units are extended, they are constrained to act in unison to raise the carriage 39 and connected left wing 36 and right wing 38. This is due to the operation of a flow divider 133 (FIG. 10) which splits the fluid flow from inport 124 equally between solenoid valves 106 and 107, as discussed in greater detail below. The lift cylinder units 74a-d could also have their barrel ends mounted together (by means of the cross bar 114) so that they act in unison in raising the carriage and the rear end of the central main frame 32. As discussed below, each hydraulic lift cylinder unit 74a-d (master cylinders) is connected in a master/slave relation with an associated wing lift cylinder units 58a, 58b, 62a, 62b (slave cylinders). The slave could be on the same side of the frame or on the opposite side of the frame. In the embodiment illustrated in FIG. 10, a crossover relationship is illustrated, wherein lift cylinder unit 74b is connected to lift cylinder unit 58a, lift cylinder unit 74a is connected to lift cylinder unit 62a, lift cylinder unit 74c is connected to lift cylinder unit 62a and lift cylinder unit 72d is connected to lift cylinder unit 58b.

As described, tubular frame members 52 and 54 of the left and right wing sections 36 and 38, respectively, pivot about corresponding pins 40 and 41. The tubular frame members 52 and 54 may be connected to the central main frame 32 using known devices such as knuckles. Preferably the knuckles include aligned apertures (not shown) forming journals for pins 40 and 41. The left 36 and right 38 wing sections are preferably assisted in their folding motion by first and second hydraulic folding cylinder units 80 and 82 for the left 36 and right 38 wing sections respectively. Preferably, the barrels of the first and second hydraulic folding cylinder units 80 and 82 are mounted at intermediate location on the central main frame 32. The rod ends of the first and second hydraulic folding cylinder units 80 and 82 are pivotally mounted to the tubular frame members 52 and 54 for pivoting the wing sections 36 and 38.

Figure 1:
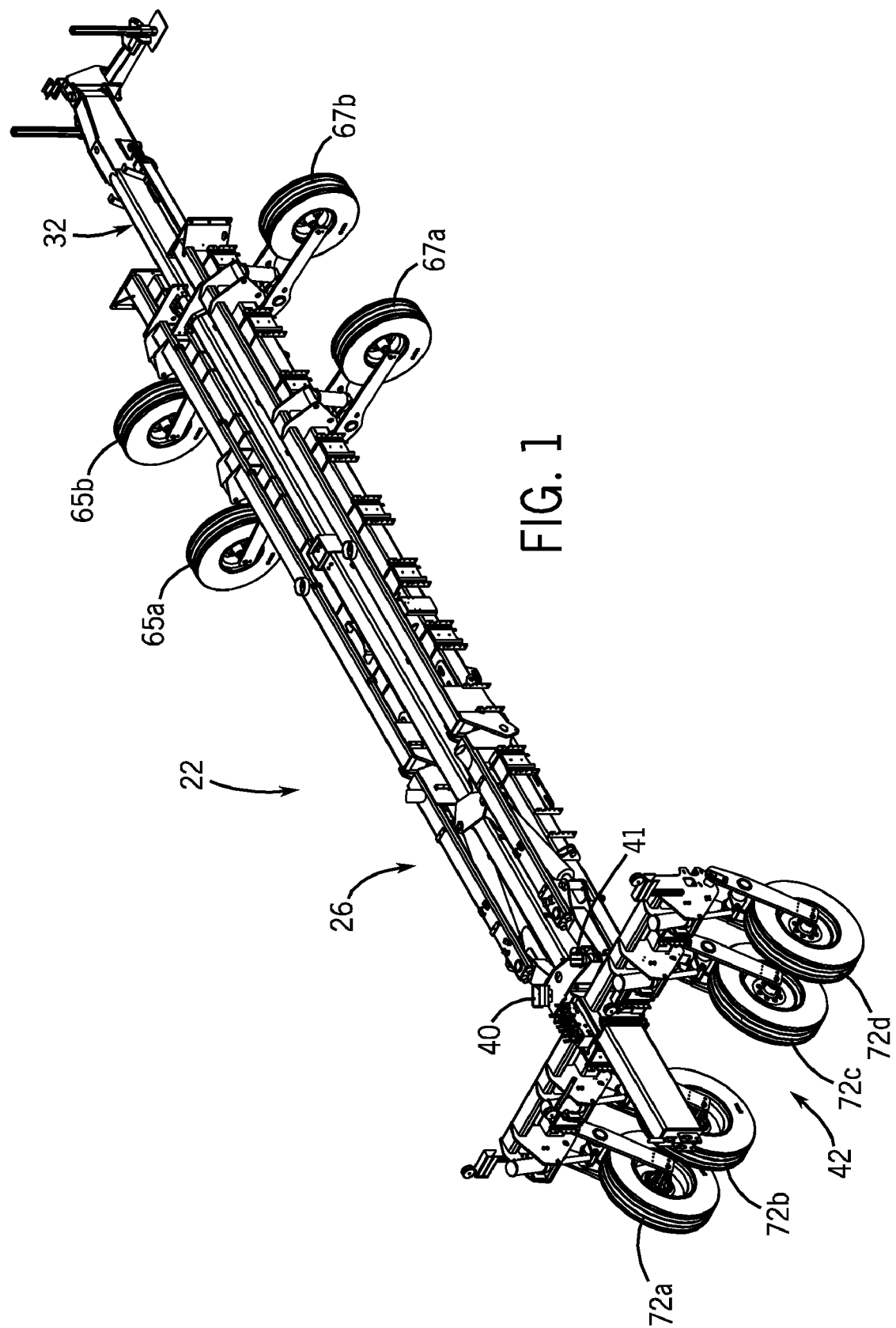
FIG. 1 illustrates an isometric view of a front fold row planter unit in a road transport position employing a hydraulic control system in accordance with the present invention.
Figure 2:
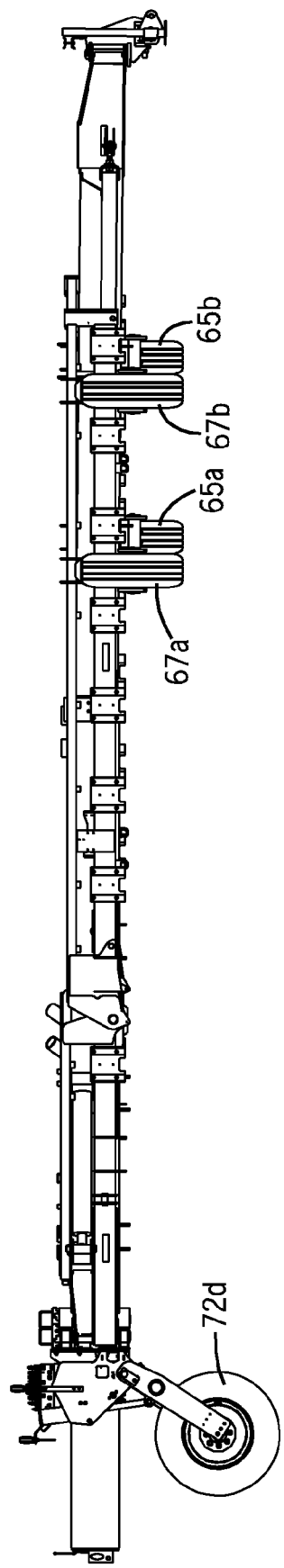
FIG. 2 illustrates a first side elevation view of the front fold row planter unit shown in FIG. 1.
Figure 3:
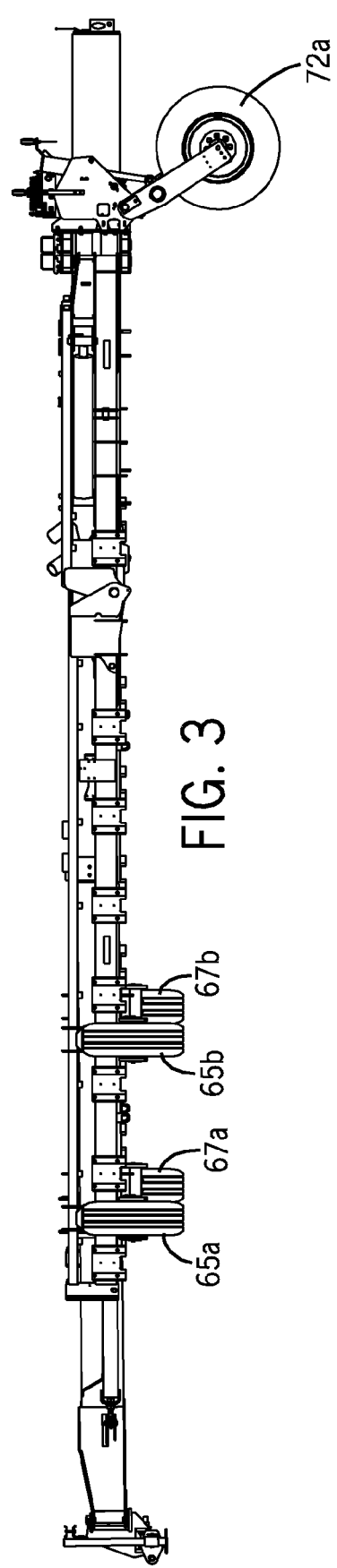
FIG. 3 illustrates an alternative side elevation view of the front fold row planter unit shown in FIG. 1.
Figure 4:
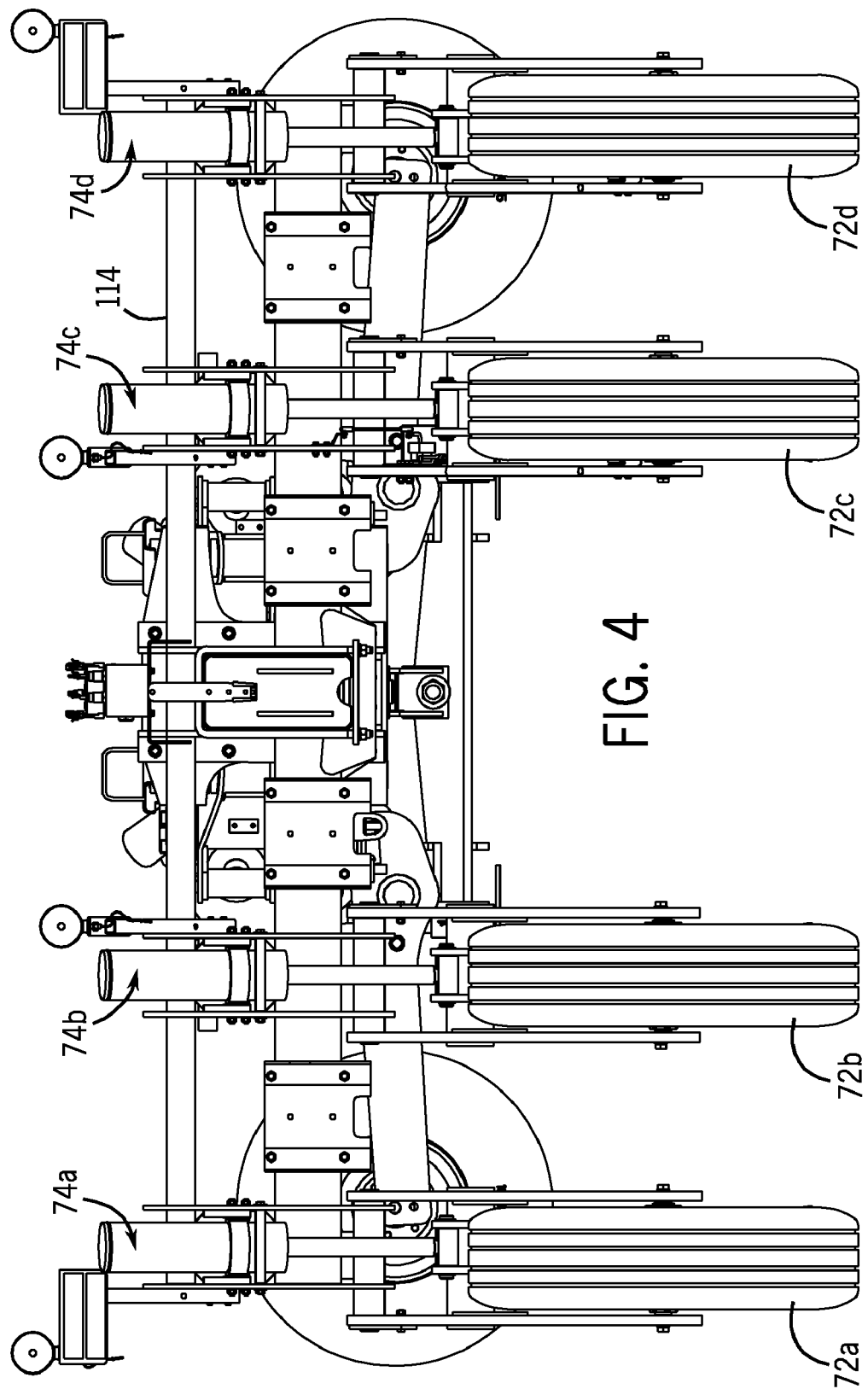
FIG. 4 illustrates a rear elevation view of the front fold row planter unit shown in FIG. 1.
Figure 5:
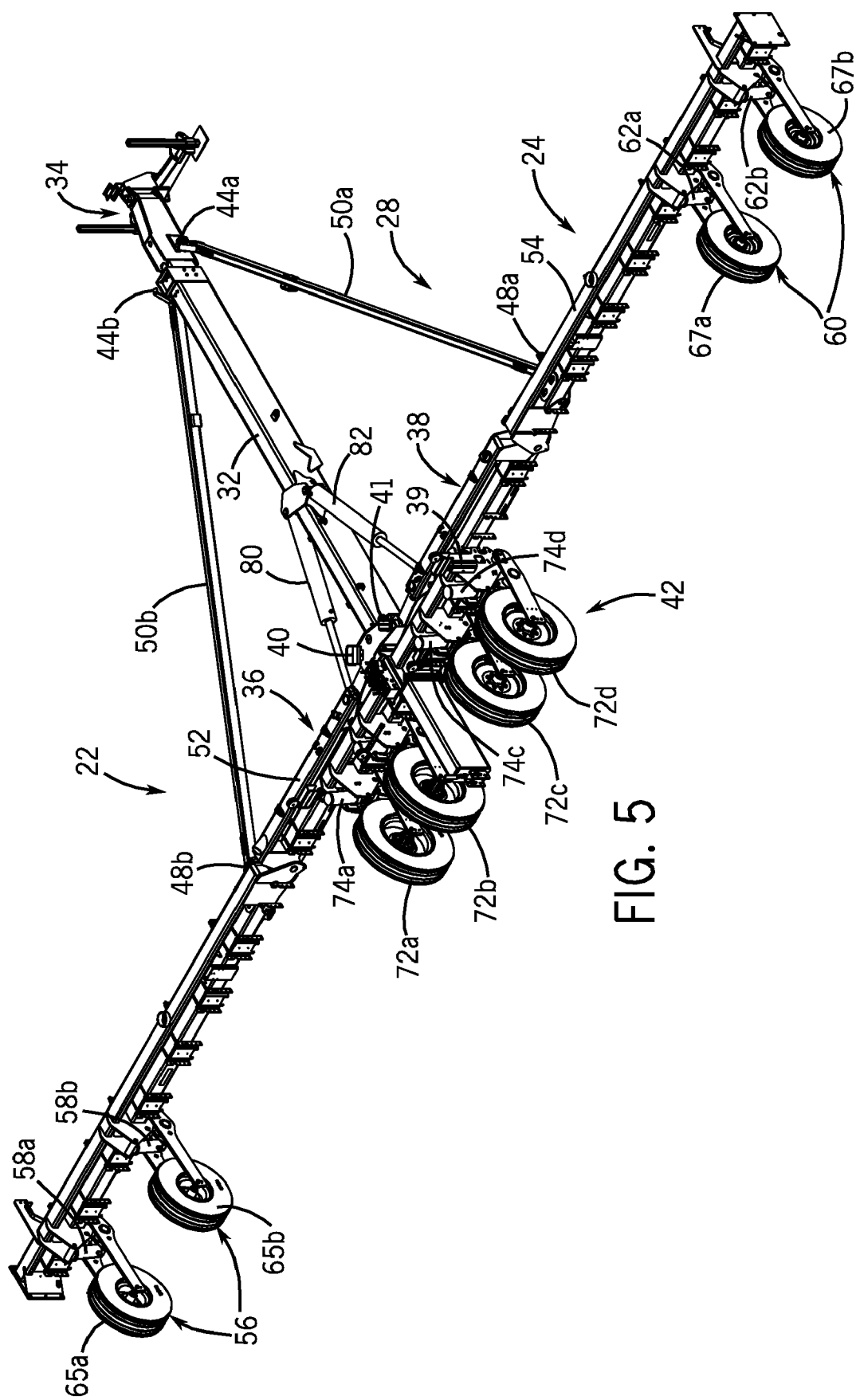
FIG. 5 illustrates an isometric view of the front fold row planter unit in a planting orientation employing a hydraulic system in accordance with the present invention.
Figure 6:
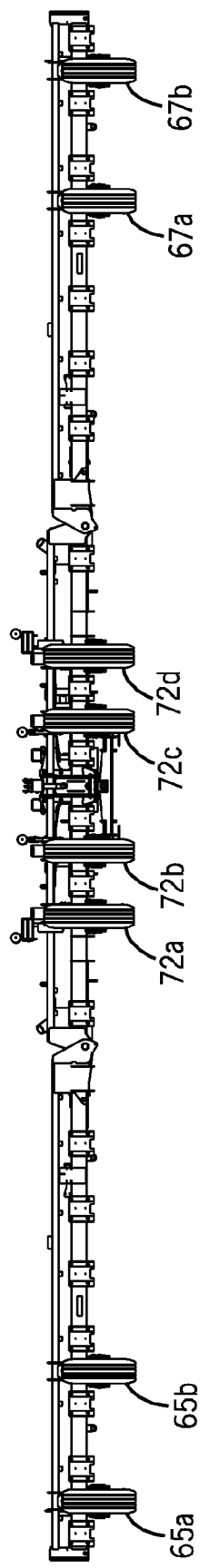
FIG. 6 illustrates a rear elevation view of the front fold row planter unit shown in FIG. 5.

The first and second hydraulic folding cylinder units 80 and 82 cooperate to open the right and left wing sections 36 and 38, respectively, for use in a planting position 28 (FIGS. 5-8) and to fold the wing sections to a road transport position 26 (FIGS. 1-4). By comparing FIGS. 1 and 5, it can be seen that the first and second hydraulic folding cylinder units 80 and 82 have maximum leverage (i.e., greatest moment arm) in the planting position 28 (FIG. 5) and minimum leverage in the folded road transport position (FIG. 1).

Referring now to the hydraulic schematic diagram of FIG. 10, the operation of the hydraulic control system 20 during lift and fold sequences will be described. The movement of the implement frame or tool bar 24 from the folded road transport position 26 of FIGS. 1-4 to the field use or planting position 28 of FIGS. 5-8 will be initially described. Subsequently, the return to the folded road transport position 26 will be described as well as the alteration between a planting position 28 and the field transport position 30 illustrated in FIG. 9. As noted above, one advantage of the hydraulic system 20 is that it allows the implement frame or tool bar 24 is to achieve distinct heights, or tool bar clearances, in the field transport 30 and road transport 26 positions.

The hydraulic components shown schematically in FIG. 10 may bear the same reference numerals as the component previously described. Thus, referring to the upper left and right portions of the diagram, the first and second hydraulic folding cylinder units 80 and 82 are labeled with corresponding reference numerals. Likewise the hydraulic lift cylinder units 58a, 58b, 62a and 62b of the wing support wheel assemblies 56 and 60 are labeled with corresponding reference numerals as are the hydraulic lift cylinder units 74a-d of ground support wheels 72a-d.

In addition to the previously described components, the hydraulic system also includes a plurality of solenoid valves 101-119 for control of the previously described cylinders. In addition, an inport 124 and an outport 126 are connected to a tractor hydraulic system (not shown) including an auxiliary valve, a hydraulic pump, a reservoir tank, and other hydraulic equipment. It will be understood that the fluid flow (and thus the pressure) may be reversed under operator control. As noted above, the hydraulic control system 20 provides an improvement over prior art systems in that the system operates as a normal master/slave system with the additional option to operate the master and slave cylinders independently of one another.

Figure 11:
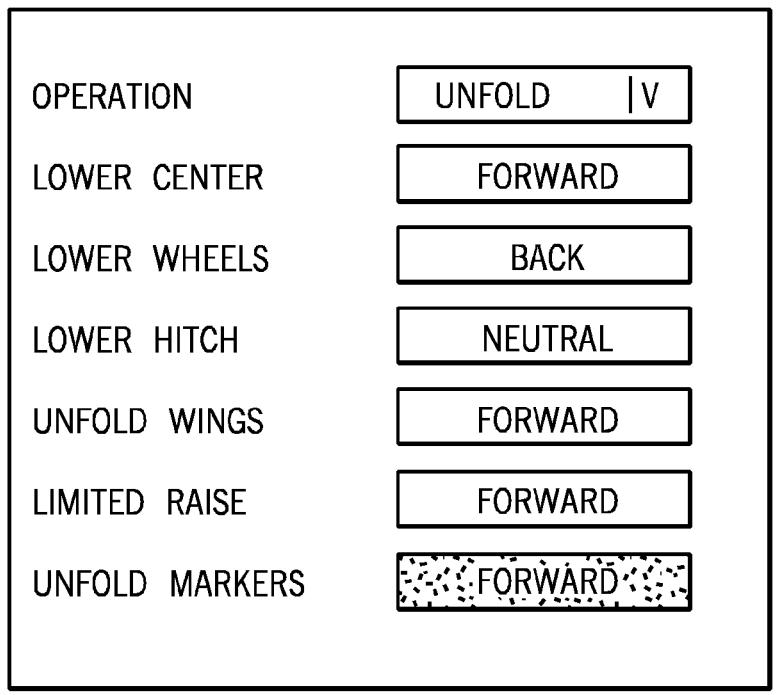
Figure 12:
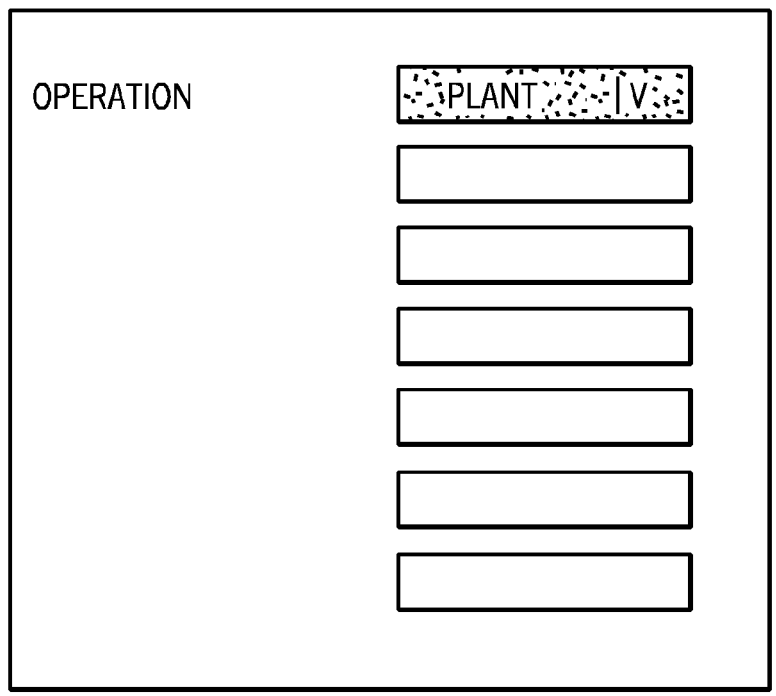

The operation of the lift and fold functions is controlled by activation of the solenoid valves 101-119 by an operator located in a tractor cab. Preferably the operator uses a touch type electronic monitor located within the cab of the prime mover. Schematic illustrations of the electronic monitor an unfold sequence, plant sequence and fold sequence are illustrated in FIGS. 11-13 respectively.

In order to move the tool bar 24 from the road transport position 26, including a road transport height or third height (FIGS. 1-4), to the planting position 28 including a planting height or first height (FIG. 5-8), the user first selects a "LOWER WHEELS" mode on a monitor. Such an action is intended to lower the ground support wheels 65*a*, 65*b*, 67*a*, 67*b* from a retracted position on the toolbar 24. Upon selection of the "LOWER WHEELS" mode, solenoids 101, 102, 104, 105, 108, and 109 are activated. Oil is supplied from the tractor auxiliary valve (not shown) to inport 124 of the hydraulic assembly 20 thereby extending hydraulic lift cylinder units 58*a*, 58*b*, 62*a* and 62*b* (or wing slave cylinders), and lowering the wheels 65*a*, 65*b*, 67*a* and 67*b* from a retracted position. This action is performed independent of lift cylinder units 74*a-d* (or wing master cylinders).

Next, a user selects a "LOWER CENTER" mode on a monitor. Such an action is intended to lower wheels 72*a-d* from their elevated maximum height or third height for road transport illustrated in, e.g. FIG. 5, wherein the cylinders 74*a-d* are fully extended. Upon selection of the "LOWER CENTER" mode, the previously energized solenoids 101, 102, 104, 105, 108, and 109 are deactivated and solenoid valves 106, 107, 110, 113, 114, and 117 are energized. Oil is supplied to the out port 126 on the hydraulic assembly 20, thereby retracting the lift cylinder units 74*a-d* (or wing master cylinders) and lowering the center section of the tool bar 24 connected to the carriage 39. Preferably, when the height of the center section of the tool bar 24 reaches a preset lowered height of the left and right wings sections 36 and 38, respectively, a limit switch (not shown) is activated thereby shutting off the energized solenoids and stopping the center section of the tool bar 24 at the same predetermined height of the wing sections 36 and 38. The tractor hitch may then be lowered using a known system, thereby lowering the front of the planter.

Next, the "UNFOLD WINGS" mode is selected on the monitor. Upon selection of the "UNFOLD WINGS" mode, solenoid valve 103 is energized. Oil is moved to the inport 124 thereby extending the fold cylinders 80 and 82 to unfold the tool bar 24 of the planter 22 to the planting position 28.

During operational movement of the planter 22 through the field, the "LIMITED RAISE" mode and the "PLANT" mode are alternated in order to raise and lower the tool bar 24 between the planting position 28 including a first height and the field transport position 30 including a second height. Upon selection of the "PLANT" or "LIMITED RAISE" mode, solenoid valves 106, 107, 108, 109, 111, 112, 115, 116 and either 118 or 119 are energized depending on the operation and orientation of the planter 22. With these operations, the planter tool bar 24 can be lowered to a planting position 28 and raised to a field transport position 30 as required. A pressure switch 121 will alternate the marker solenoid 118 and 119 to allow for automatic alternation every time the planter is raised and lowered.

For example, in order to move from a planting position 28 to the field transport position 30, the "LIMITED RAISE" mode is selected. Upon selection of the "LIMITED RAISE" mode, solenoid valves 106, 107, 108, 109, 111, 112, 115, 116 and 118 are energized. Oil is supplied to the inport 124 of the hydraulic assembly 20, to extend both cylinder units 74*a-d* (wing master cylinders) and hydraulic lift cylinder units 58*a*, 58*b*, 62*a* and 62*b* (wing slave cylinders) to the field transport position 30 illustrated in FIG. 9. When in the field transport position 30, the lift cylinder units 58*a*, 58*b*, 62*a* and 62*b* (wing slave cylinders) are fully extended while lift cylinder units 74*a-d* (wing master cylinders) are only partially extended. When the lift cylinder units 58*a*, 58*b*, 62*a* and 62*b* (wing slave cylinders) are fully extended, they cannot accept any more fluid.

In order to return from a field transport position 30 to the planting position 28, the "PLANT" mode is selected. Upon selection of the "PLANT" mode, solenoids 106, 107, 108, 109, 111, 112, 115, 116 and 119 are energized. Oil is supplied to the outport 126 of the hydraulic assembly 20, thereby retracting both lift cylinder units 74*a-d* (wing master cylinders) and hydraulic lift cylinder units 58*a*, 58*b*, 62*a* and 62*b* (wing slave cylinders) lift cylinder units to the planting transport position 28 illustrated in FIG. 9.

When moving the planter tool bar 24 from a field transport position 30 or second height to a road transport position 26 or third height, an operator will initially select the "FOLD WINGS" mode on the monitor. Upon selection of the "FOLD WINGS" mode, solenoid valve 103 is energized. Oil is moved to the outport 124 of the hydraulic control system 20, thereby retracting first and second hydraulic folding cylinder units 80, 82 and folding the planter. Next, the tractor hitch is raised using a known mechanism. Once the hitch has been raised, the "RAISE CENTER" mode is selected. Upon selection of the "RAISE CENTER" mode, solenoids 106, 107, 110, 113, 114 and 117 are energized and solenoid valve 103 is deenergized. Oil moved to the inport 124 of the hydraulic assembly 20, to partially extended lift cylinder units 74*a-d* (or wing master cylinders), extending them to their maximum stroke. The rising of lift cylinder units 74*a-d* to their maximum stroke raises the planter tool bar 24 to its maximum road transport height third height in the road transport position 26.

Next the "RAISE WHEEL" mode is selected. Upon selection of the "RAISE WHEEL" mode, solenoids 101, 102, 104, 105, 108, and 109 are energized and solenoids 106, 107, 110, 113, 114 and 117 are deenergized. Oil is moved to the outport 126, and the hydraulic lift cylinder units 58*a*, 58*b*, 62*a* and 62*b* (or wing slave cylinders) retract thereby raising wheels 65*a*, 65*b*, 67*a*, 67*b* to a retracted road transport position on the toolbar 24. The monitor is then shut off and the solenoids deenergized. The planter is then in the road transport mode.

Many changes and modifications could be made to the invention without departing from the spirit thereof. The scope of these changes will become apparent from the appended claims.

I claim:

1. A hydraulic control system for use with an agricultural implement frame, the frame configured to move between a first height, a second height and a third height, from a supporting surface, comprising:

a first set of hydraulic cylinders mounted to the implement frame, the first set of hydraulic cylinders having a first configuration wherein the frame is the first height above the supporting surface, a second configuration wherein the frame is the second height above the supporting surface; and a third configuration wherein the frame is a third height above the supporting surface;

a second set of hydraulic cylinders fluidly connectable to the first set of hydraulic cylinders and mounted to the implement frame, the second set of hydraulic cylinders having a first configuration wherein the frame is the first height above the supporting surface and a second configuration wherein the frame is the second height above the supporting surface; and wherein:
the first and second sets of hydraulic cylinders operate in a master/slave relationship as the first and second sets of hydraulic cylinders move from between the first and second configurations; and
the first and second sets of cylinders are operable independent of each other.

2. The hydraulic control system of claim 1, wherein actuation of the first and second set of hydraulic cylinders moves the frame between the first height and the second height.

3. The hydraulic control system of claim 2, wherein actuation of the first set of hydraulic cylinders moves the frame between the second height and the third height.

4. The hydraulic control system of claim 2, wherein:
at the first height the implement frame is orientated in a ground engaging position;
the second height is greater than the first height; and
the third height is greater than the first and second heights.

5. The hydraulic control system of claim 1, further comprising a third set of cylinders configured to fold the implement frame.

6. The hydraulic control system of claim 1, wherein the agricultural implement frame is a tool bar of a front fold planter.

7. The hydraulic control system of claim 6, wherein the tool bar includes first and second wing sections.

8. The hydraulic control system of claim 6, wherein the first set of hydraulic cylinders are connected to a main wheel set and the second set of cylinders are connected to first and second wing wheel assemblies.

9. An agricultural frame comprising:
a tool bar configured to move between a first height, a second height and a third height above a supporting surface; and
a hydraulic control system for controlling movement of the tool bar, the hydraulic control system including:
a first set of hydraulic cylinders mounted to the tool bar configured to move the frame between the first height, the second and the third height; and
a second set of hydraulic cylinders mounted to the implement frame configured to move the frame between the first height and the second height;
wherein:
the first and second sets of cylinders are arranged in a master/slave relationship relative to each other as the frame is moved between the first and second heights; and
the first and second sets of cylinders are operable independent of each other.

10. The agricultural frame of claim 9, wherein the first and second set of hydraulic cylinders are actuated to move the tool bar from the first height to the second height.

11. The agricultural frame of claim 10, wherein the first set of hydraulic cylinders is actuated to move the tool bar between the second height to the third height.

12. The agricultural frame of claim 9, wherein at the first height the tool bar is orientated in planting position, at the second height the tool bar is orientated in a field transport position above the planting position and at the third height the tool bar is orientated in a road transport position above the planting position.

13. The agricultural frame of claim 12, further comprising a third set of cylinders configured to fold the tool bar.

14. The agricultural frame of claim 13, wherein in the road transport position the third set of cylinders fold the tool bar.

15. The agricultural frame of claim 9, wherein the tool bar includes first and second wing sections connected to first and second wing wheel assemblies and a main wheel set connected to the tool bar.

16. The agricultural frame of claim 15, wherein the first set of hydraulic cylinders are connected to a main wheel set and the second set of cylinders are connected to first and second wing wheel assemblies.

17. The agricultural frame of claim 16, wherein in a road transport position the second set of cylinders retract independently to retract the first and second wing wheel assemblies.

18. A method of moving an implement frame comprising:
actuating a first and a second set of hydraulic cylinders mounted to the implement frame to move the frame between a first height and a second height;
actuating the first set of hydraulic cylinders to move the frame between the second height and a third height; and
wherein:
the first and second sets of cylinders are arranged in a master/slave relationship relative to each other as the frame is moved between the first and second heights; and
the first and second sets of cylinders are operable independent of each other.

19. The method of claim 18, further comprising folding the frame by actuating a third set of hydraulic cylinders mounted to the implement frame.

20. The method of claim 18, wherein the agricultural implement frame is a tool bar of a front fold planter including foldable first and second wing sections.

* * * * *